UNITED STATES PATENT OFFICE.

CHARLES H. FRANTZ, OF NEW ORLEANS, LOUISIANA.

SOLDER FOR ALUMINUM.

1,067,016.  Specification of Letters Patent.  Patented July 8, 1913.

No Drawing.  Application filed April 26, 1913.  Serial No. 763,918.

*To all whom it may concern:*

Be it known that I, CHARLES H. FRANTZ, a citizen of the United States, residing at New Orleans, in Orleans parish and State of Louisiana, have invented a new and useful Solder for Aluminum, of which the following is a specification.

This invention has reference to improvements in solder for aluminum, and its object is to provide a solder for such purpose which may be used without the necessity of employing a flux and which in characteristics closely approaches aluminum, so that the joint is as durable as the body of the metal to which the solder is applied.

In accordance with the present invention the solder is made up of zinc, tin, lead and aluminum, and of these ingredients there is taken by weight ten parts of zinc, ten parts of tin, one part of lead, and one part of aluminum. To prepare the solder the zinc is heated until melted and the tin is then added, and when melted the two are well mixed together. To this melted compound of zinc and tin the lead is added and the mixing continued, and finally the aluminum is mixed with the other ingredients until the whole is thoroughly dissolved and the molten mass may then be poured into molds, so that when hard it is preferably in the form of sticks, but such particular form is not obligatory.

When it is desired to use the solder, as, for instance, to repair a crack in an aluminum article, or to connect the parts of a broken aluminum article, or to make any other repair, the edges to be joined are cleaned with an ordinary wire brush, or otherwise, and then by means of a blow torch or other suitable source of heat the solder is melted and applied and spread by the use of any suitable blade which will permit the working of the melted solder even in confined places, as in the case of a crack, or seam, so that such crack or seam is filled with melted solder, which when cold readily adheres to the walls of the seam or crack and unites them, or in the case of two parts to be joined, the solder unites to each part in a manner similar to ordinary soldering with metals to which ordinary solder is applicable. No flux is employed at all and is wholly unnecessary.

The solder of the present invention is tough, flexible, non-corrodible, is not brittle, will not chill, and will stand excessive strains. This last feature is an important one, as is also the fact that the solder will unite firmly with aluminum even in the form of a casting, and a joint formed of the solder will not separate except it be heated to, say, 700° to 750° F., which is about the heat causing the solder to melt.

Aluminum castings or other aluminum articles or parts united by the solder of the present invention have been severely tested without the solder joint giving away, thus demonstrating that the union of the solder with the aluminum article is fully equal in strength to the body of the aluminum, and, furthermore, the appearance of the solder so nearly approaches the appearance of aluminum that the joint is not easily detected. The density of the solder is such that where a repair is quite extensive, as when the solder is employed to replace a considerable area in the wall of a casting or other structure of aluminum, the new wall formed of the solder will ring in close similarity to the aluminum parts of the wall.

The melting point of the solder, which is about 700° to 750° F., is considerably below the melting point of aluminum, which latter melting point is in the neighborhood of 1200° F., so that there is no danger of burning the metal being soldered. The solder joint or filling may be bent or hammered without harm and without the slightest sign of separation, thus showing the union to be complete.

The invention is not limited to the exact proportions stated, but those given have proven in practice to be proper ones for imparting the desired characteristics to the solder.

What is claimed is:—

1. A solder for aluminum comprising zinc, tin, lead and aluminum, with the zinc and tin each in excess of the lead and aluminum.

2. A solder for aluminum comprising zinc, tin, lead and aluminum, with the sum of the quantities of zinc and tin by weight substantially ten times that of the lead and aluminum.

3. A solder for aluminum comprising substantially ten parts of zinc, ten parts of tin, one part of lead and one part of aluminum, all by weight.

In testimony, that I claim the foregoing as my own, I have hereto affixed my signature in the presence of two witnesses.

CHARLES H. FRANTZ.

Witnesses:
JULES ALBRIGHT,
VAL. J. SLENTZ.